United States Patent [19]

Zhong et al.

[11] Patent Number: 5,684,682
[45] Date of Patent: Nov. 4, 1997

[54] METHOD AND APPARATUS FOR SELECTABLE DC TO DC CONVERSION

[75] Inventors: Zhong Kai Zhong, Lake Worth; Daniel Tran, Boynton Beach, both of Fla.

[73] Assignee: Motorola, Inc., Schaumburg, Ill.

[21] Appl. No.: 503,958

[22] Filed: Jul. 19, 1995

[51] Int. Cl.$^6$ .................................................. H02M 3/07
[52] U.S. Cl. .................................................. 363/59; 363/60
[58] Field of Search .......................... 363/59, 60; 323/266

[56] References Cited

U.S. PATENT DOCUMENTS

| | | | |
|---|---|---|---|
| 3,646,425 | 2/1972 | Beck et al. | 363/60 |
| 4,961,006 | 10/1990 | Pace et al. | 323/289 |
| 5,006,974 | 4/1991 | Kazerounian et al. | 363/60 |
| 5,028,861 | 7/1991 | Pace et al. | 323/222 |
| 5,132,895 | 7/1992 | Kase | 363/60 |
| 5,339,236 | 8/1994 | Tamagawa | 363/59 |
| 5,414,614 | 5/1995 | Fette et al. | 363/59 |
| 5,563,779 | 10/1996 | Cave et al. | 363/59 |

*Primary Examiner*—Jeffrey L. Sterrett
*Attorney, Agent, or Firm*—R. Louis Breeden; Aaron B. Bernstein

[57] ABSTRACT

A method and apparatus for DC-DC conversion. The apparatus includes a voltage detector (152) for detecting a voltage level in the circuit; a capacitive voltage doubler configuration of the DC to DC conversion circuits (130); a capacitive voltage tripler configuration of the DC to DC conversion circuits (130); selector circuitry (134) responsive to the voltage detector (152) for enabling the doubler or tripler configurations; and a voltage regulator (132) for regulating the converted DC voltages. The selector circuitry (134) initially enables the doubler, and then disables the doubler and enables the tripler when the voltage level drops below a reference voltage. In an alternate embodiment, high load signal HLVBB is provided when a high power load is to be enabled, such that the selector circuitry (134) temporarily disables the doubler and temporarily enables the tripler until the high load signal is inactive.

17 Claims, 8 Drawing Sheets

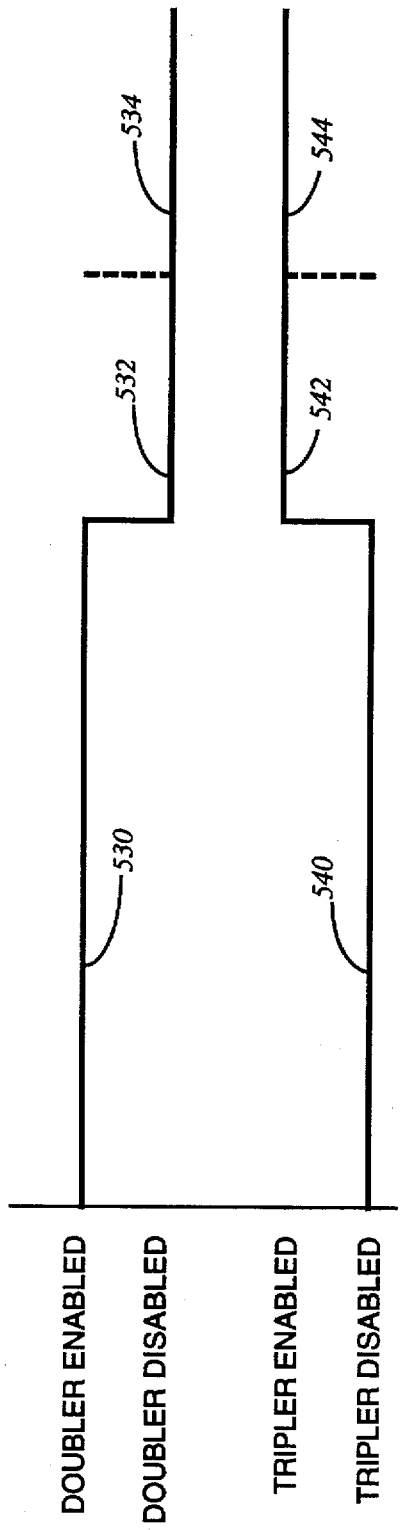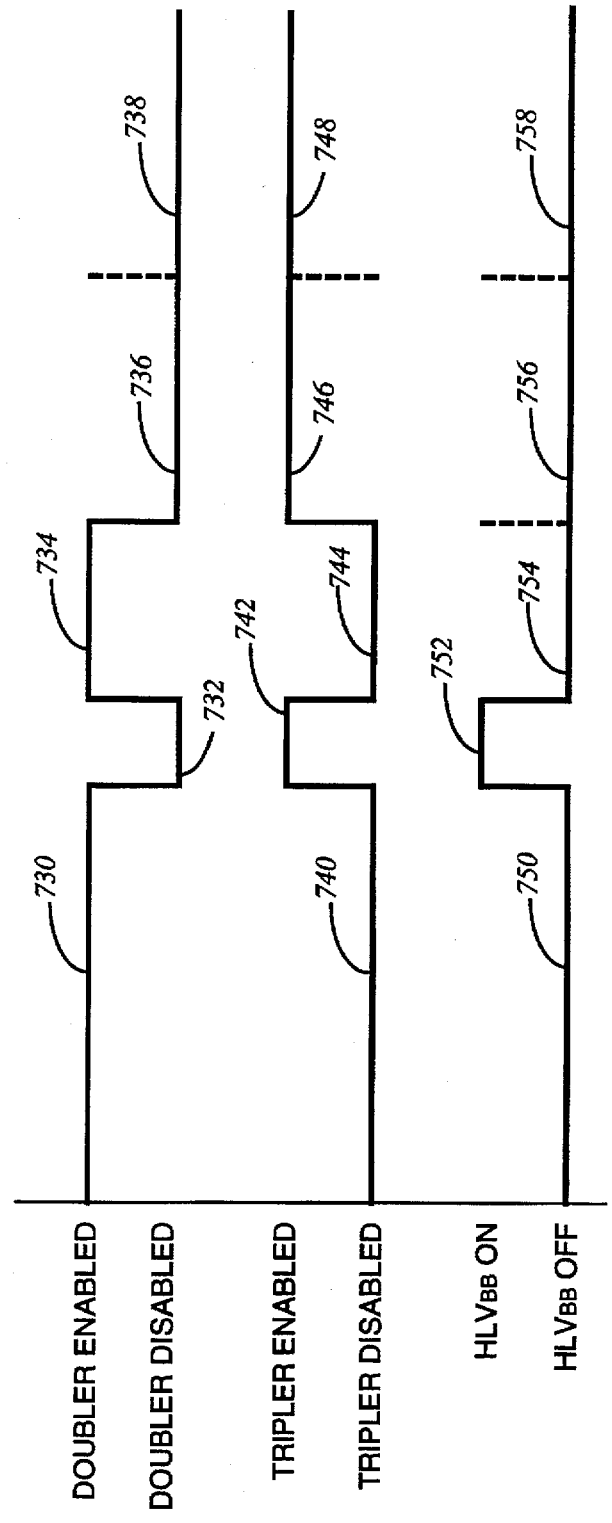

METHOD AND APPARATUS FOR SELECTABLE DC TO DC CONVERSION

FIELD OF THE INVENTION

This invention relates in general to a method and apparatus for DC to DC conversion. More particularly, this invention relates to a method and apparatus for capacitive DC to DC conversion with high efficiency and low battery voltage operation.

BACKGROUND OF THE INVENTION

Portable receivers such as selective call receivers, pagers, personal messaging units (PMUs), and the like generally utilize a single cell battery for operation. These devices may contain components, such as a microprocessor which requires higher operating voltage than is available from the single cell battery. Accordingly, such devices require DC to DC conversion to provide the operating voltage needed for the components, such as the microprocessor, controller or LCD panel. DC to DC converters are used to boost the battery voltage to a converted voltage high enough to operate these components.

Inductive DC to DC converters have been used in the industry. One such converter is illustrated in U.S. Pat. No. 5,028,861 to Pace, assigned to the assignee of the present invention and incorporated herein by reference and generally described below. The DC to DC converter regulates the maximum current through an inductor. It operates within a paging receiver and boosts a voltage from a 1.4V DC single cell battery to substantially 3.1V DC in order to operate the circuits which require more voltage than a single cell battery.

Some of the disadvantages of using inductive DC to DC converters versus capacitive DC to DC converters are that inductors are less efficient, larger, and cost more than capacitors. Inductors are also less reliable, since they are more susceptible to shock and vibration. Furthermore, inductors are affected by other signals which occur in the receiver.

One solution to the problems associated with inductive DC to DC converters is realized in current CMOS capacitive voltage doublers (DC-DC converters) which use two external capacitors and alternate precharge and dump phases to generate double the battery voltage. For battery voltage $V_{BB}$, the doubler increases this voltage to $2V_{BB}$. A voltage regulator may then be used to lower this voltage to the required level for operating the various components. For a voltage doubler, efficiency E is calculated by the equation $E=V_{out}/2V_{BB}$. In a purely efficient operation (E=1.0), $V_{out}$ would equal $2V_{BB}$. Accordingly, if it is desired to produce $V_{out}$= 2.1V, with a battery initially charged to 1.55V, then the voltage doubler would produce a maximum of $2 \times 1.55V$= 3.1V, which would need to be regulated down to 2.1V. The battery will slowly discharge over time and, upon reaching 1.05V, it will be at maximum efficiency, $V_{out}=2V_{BB}$ (2.1V= $2 \times 1.05V$). After that point, $V_{out}$ will no longer be sufficient to power the components and the battery should be replaced. Accordingly, the $V_{BB}$ "low level" would be limited at 1.05V. In this scenario, the efficiency is calculated to be between 0.68 and 1.00 (with 1.00 being the maximum at $V_{BB}$= 1.05V). The average efficiency is 0.83.

One problem with these CMOS capacitive voltage doublers, is that, as the battery discharges with usage over time, the operating voltage falls below suitable levels (e.g., 1.05V) and the battery would need to be replaced, even though it may still be supplying a reduced level of power. Specifically, the microprocessor can no longer operate when the doubled voltage falls below 2.1V in a pager. So, even though the battery has not completely discharged, it would need to be replaced. This results in higher costs to the end user in replacing the battery and may also lead to a greater risk of mechanical failure with the continued opening of the battery compartment. If the device is designed to be water resistant, frequent opening of the battery compartment may destroy or damage the water seal.

One solution to this problem would be to extend the battery life beyond the limits set by voltage doublers so that, for example, a pager can still operate for a time after the battery voltage falls below 1.05V.

Thus, there is a need in the art to extend the battery life beyond the limits set by voltage doublers that is efficient, reliable, economical and small sized.

BRIEF DESCRIPTION OF THE DRAWINGS

FIG. 6 is a timing diagram representing the operative stages of the various doubler and tripler configurations.

FIG. 9 is a timing diagram representing the operative stages of the various doubler and tripler configurations in an alternate embodiment of the invention.

DESCRIPTION OF THE PREFERRED EMBODIMENTS

Figure 1:
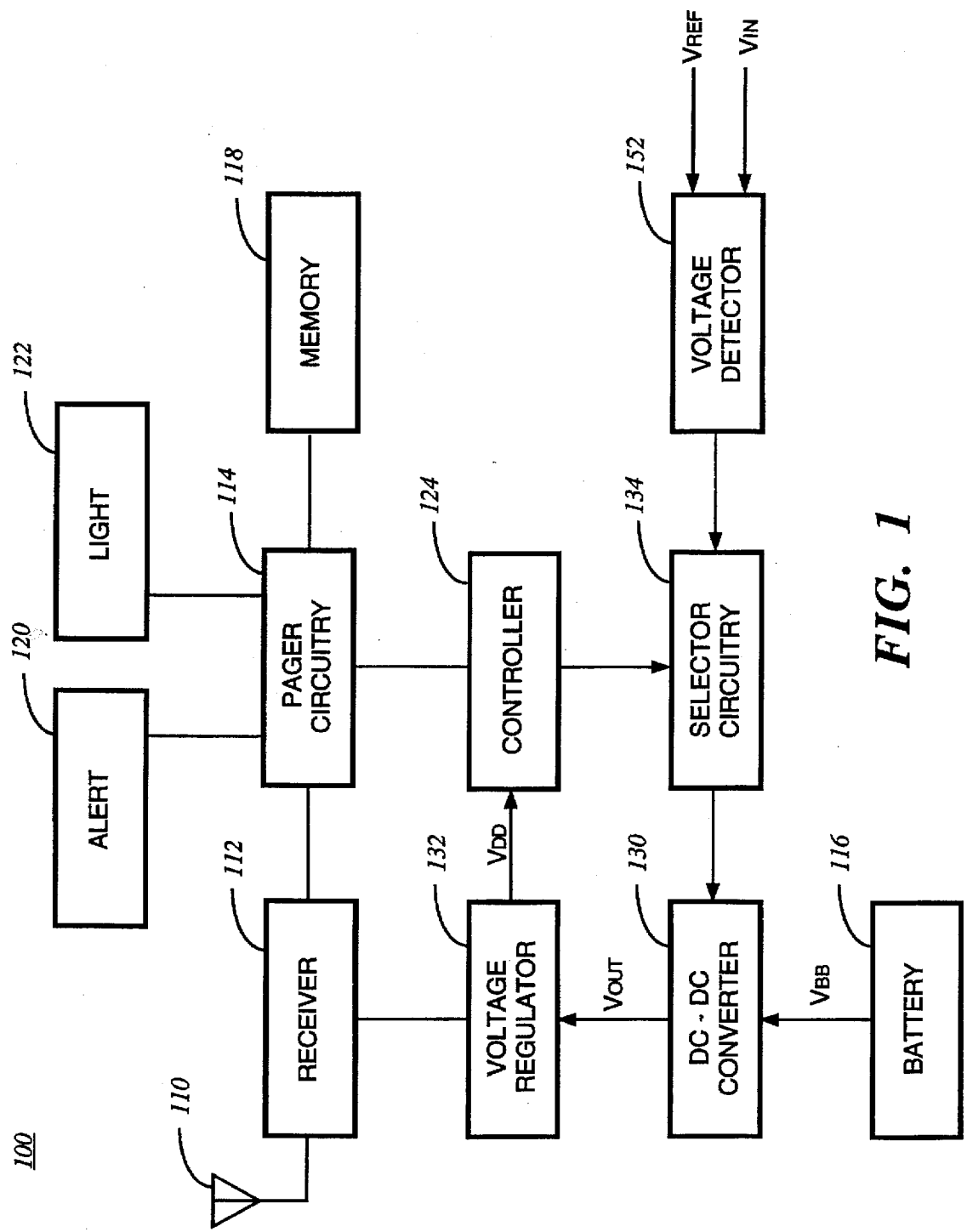
FIG. 1 is a block diagram of a pager operating in accordance with the present invention.

Referring initially to FIG. 1, a block diagram of a pager 100 operating in accordance with the present invention is shown. Paging signals are received by an antenna 110 and demodulated by a receiver 112. The paging signals may then be decoded by pager circuitry 114 controlled by a controller 124, such as a microprocessor. The receiver 112 is powered by a single cell battery 116 which generates a voltage $V_{BB}$, typically a 1.4V battery which has a maximum voltage of substantially 1.55V which decreases as the battery discharges over time.

Receiving and decoding paging signals is well known in the art. The paging signals may be received on any of a plurality of paging protocols such as the GSC, POGSAG, or other protocols. In response to the reception of the paging signals, the receiver 112 is periodically activated. Additionally, the decoder operates in a low power mode while the receiver 112 is inactive and operates in a high power mode while the receiver 112 is active. The decoder searches the paging signal for an address which matches an address stored in memory 118. In response to detecting the address, an alert 120 may be generated, such as a tone or vibration which causes an increased load on the circuitry. Furthermore, the LCD display may include a light 122 which also loads the circuitry. Thus, it can be appreciated that the power consumption may vary dramatically.

The pager 100 includes a capacitive DC to DC converter 130 which can be configured into various multipliers (N) (e.g., N=2=doubler, N=3=tripler, etc.) by adding extra external capacitors. A voltage regulator 132 is then utilized to decrease the voltage level, Vout, to a required level for operation, $V_{DD}$. The configuration of the DC to DC converter 130 is dependent, in part, on the battery voltage $V_{BB}$ and, in part, on the load. A voltage detector 152 (shown in FIG. 7) within the selector circuitry 134 is used to determine when the DC to DC converters 130 should be switched between the various configurations.

Referring generally to FIG. 1, the preferred embodiment of the invention generally includes, a voltage detector 152 for detecting a voltage level in a circuit; first DC to DC converter configuration of the DC to DC converter 130 (e.g., voltage doubler) for converting a first DC voltage, (e.g., the battery voltage, $V_{BB}$) to a first converted DC voltage, (e.g., Vout); second DC to DC converter configuration of the DC to DC converter 130 (e.g., voltage tripler) for converting the first DC voltage, $V_{BB}$, to a second converted DC voltage, (e.g., Vout); selector circuitry 134 responsive to the voltage detector 152 for selectively enabling the first or the second converters; and a voltage regulator 132 for regulating the first and second converted DC voltage (e.g., Vout) to a predetermined regulated voltage, $V_{DD}$. The selector circuitry 134 initially enables the first converter configuration, and then disables the first converter configuration and enables the second converter configuration when the voltage level drops below a reference voltage, $V_{REF}$, substantially equal to a minimum required voltage to adequately drive a load.

Figure 2:
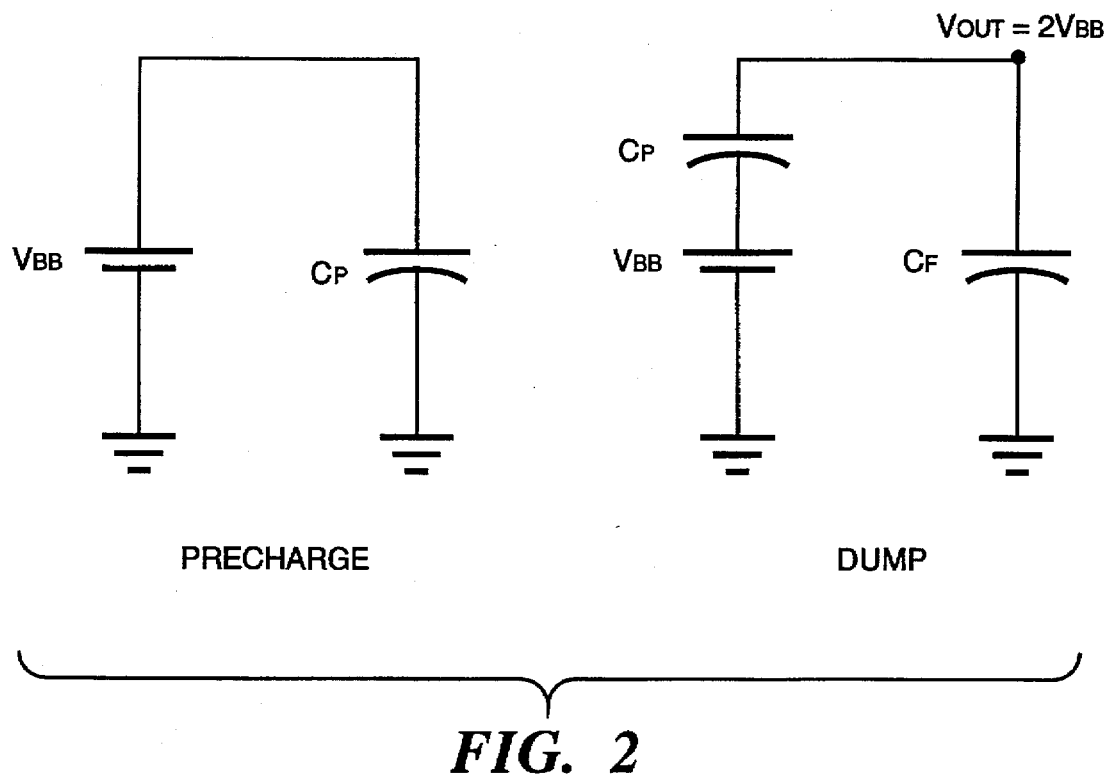
FIG. 2 is a circuit diagram of the doubler configuration for a capacitive DC to DC converter.

FIG. 2 shows the preferred configuration for a multiplier where N=2, i.e., doubler, in its precharge and dump stages. The preferred circuitry for switching between these stages is detailed in FIG. 7. These stages are controlled by a clock circuit which continuously alternates the capacitor configurations between precharge and dump. $V_{BB}$ is the battery voltage. During the precharge phase, capacitor Cp (pump-capacitor) is charged. Once Cp is fully charged, $V_{Cp}=V_{BB}$, then during the dump phase, Cp is in series with $V_{BB}$ to produce $V_{out}=V_{Cp}+V_{BB}=2V_{BB}$. A filter capacitor, Cf, is used to smooth the output voltage.

Figure 3:
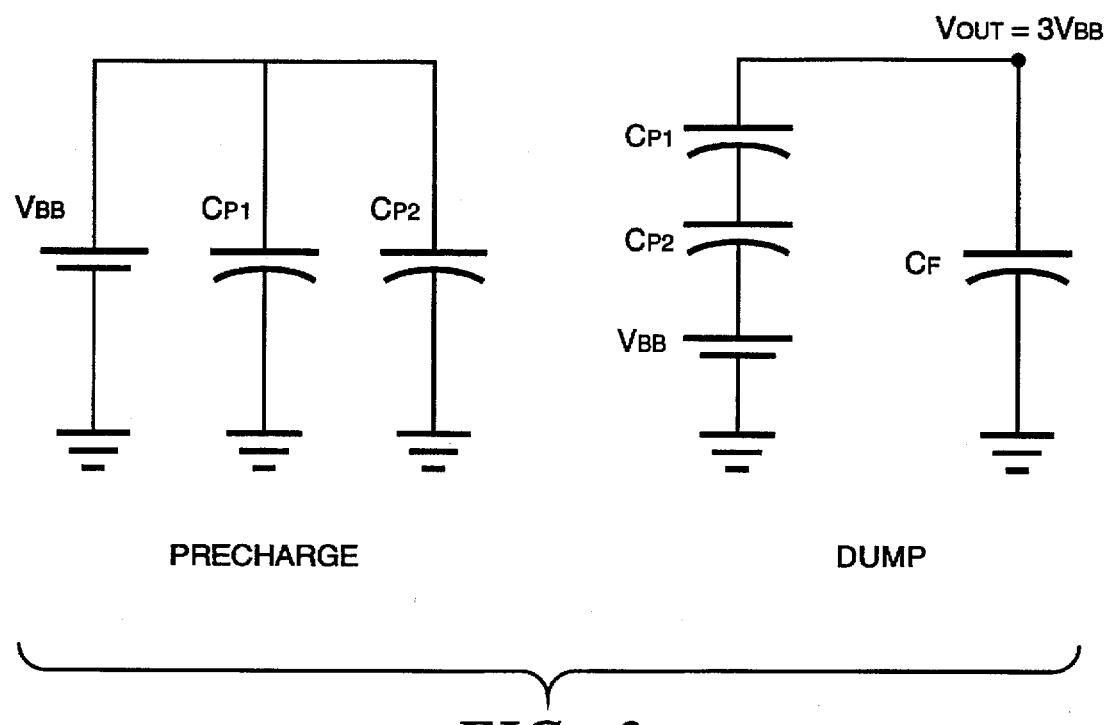
FIG. 3 is a circuit diagram of the tripler configuration for a capacitive DC to DC converter.

FIG. 3 shows the preferred configuration for a multiplier where N=3, i.e., tripler, in its precharge and dump stages. Again, the preferred circuitry for switching between these stages is detailed in FIG. 7. During the precharge phase, capacitors Cp1 and Cp2 are connected in parallel to $V_{BB}$ and are thereby charged. Once the capacitors are fully charged, $V_{Cp1}$=and $V_{Cp2}=V_{BB}$. Accordingly, at the dump phase, $V_{out}=V_{Cp1}+V_{Cp2}+V_{BB}=3V_{BB}$. A filter capacitor, Cf, is used to smooth the output voltage.

For the tripler, efficiency E is calculated by the equation $E=V_{out}/3V_{BB}$. At maximum efficiency $V_{BB}=V_{out}/3$ Accordingly, if it is desired to produce Vout $\geq$2.1V, with a battery 1.55V$\geq V_{BB} \geq$0V, then the tripler would produce a maximum of 3×1.55V=4.65V, which would need to be regulated down to $V_{DD}$=2.1V. Maximum efficiency would be reached when $V_{BB}=V_{out}/3=2.1V/3=0.7V$. After that point, Vout will no longer be sufficient to power the components and the battery should be replaced. For the tripler, the $V_{BB}$ low level would not be limited until 0.7V. Thus, a tripler would increase the usable battery life by 12% compared to using only a doubler.

For maximum efficiency, in a preferred embodiment of the invention, the doubler would be used when $V_{BB} \geq$1.05V, then the tripler would be activated for 1.05V>$V_{BB} \geq$0.7V. The efficiency for the tripler, in this scenario, is between 0.67 and 1.00 (with 1.00 being the maximum at $V_{BB}$=0.7V). The average efficiency is 0.82.

One skilled in the art would recognize configurations for larger multipliers, and the efficiency thereof, depending on the desired output voltage based on the input voltage.

In the preferred operation of the present invention, the microprocessor controls the switching between the doubler and the tripler configurations, which depends, in part, on relative voltages affected by $V_{BB}$, for maximum efficiency, as illustrated in the example below. The value of $V_{BB}$ constantly decreases as the battery discharges over time.

If, for example, a 1.4V battery ($V_{BB}$) is used and a load requires a minimum operating voltage of $V_{REF}$=2.1V, initially the battery voltage ($V_{BB}$) would need to be doubled by a doubler. The output of the doubler ($V_{out}=2V_{BB}$), could then be regulated down to $V_{DD}=V_{REF}$=2.1V. As the voltage of the battery decreases over time through discharge, the output of the doubler, Vout, decreases proportionately. As long as the doubled battery voltage (2$V_{BB}$) is greater than or equal to the minimum operating voltage $V_{REF}$, the doubler configuration is sufficient to operate the load. However, once the doubled battery voltage is no longer high enough to operate the load (2$V_{BB}$=Vout<$V_{REF}$), a tripler configuration will be necessary to provide sufficient voltage to operate the load.

In a tripler configuration, the battery voltage ($V_{BB}$) is tripled by a tripler. The output of the tripler ($V_{out}=3V_{BB}$), is then regulated down to $V_{DD}=V_{REF}$=2.1V. As long as the tripled battery voltage (3$V_{BB}$) is greater than or equal to the minimum operating voltage of $V_{REF}$=2.1V, the tripler configuration will be sufficient to operate the load. However, once the tripled battery voltage is no longer high enough to operate the load (3$V_{BB}$=Vout<$V_{REF}$), the minimum operating voltage can no longer be sustained, and the battery should be replaced.

Figure 4:
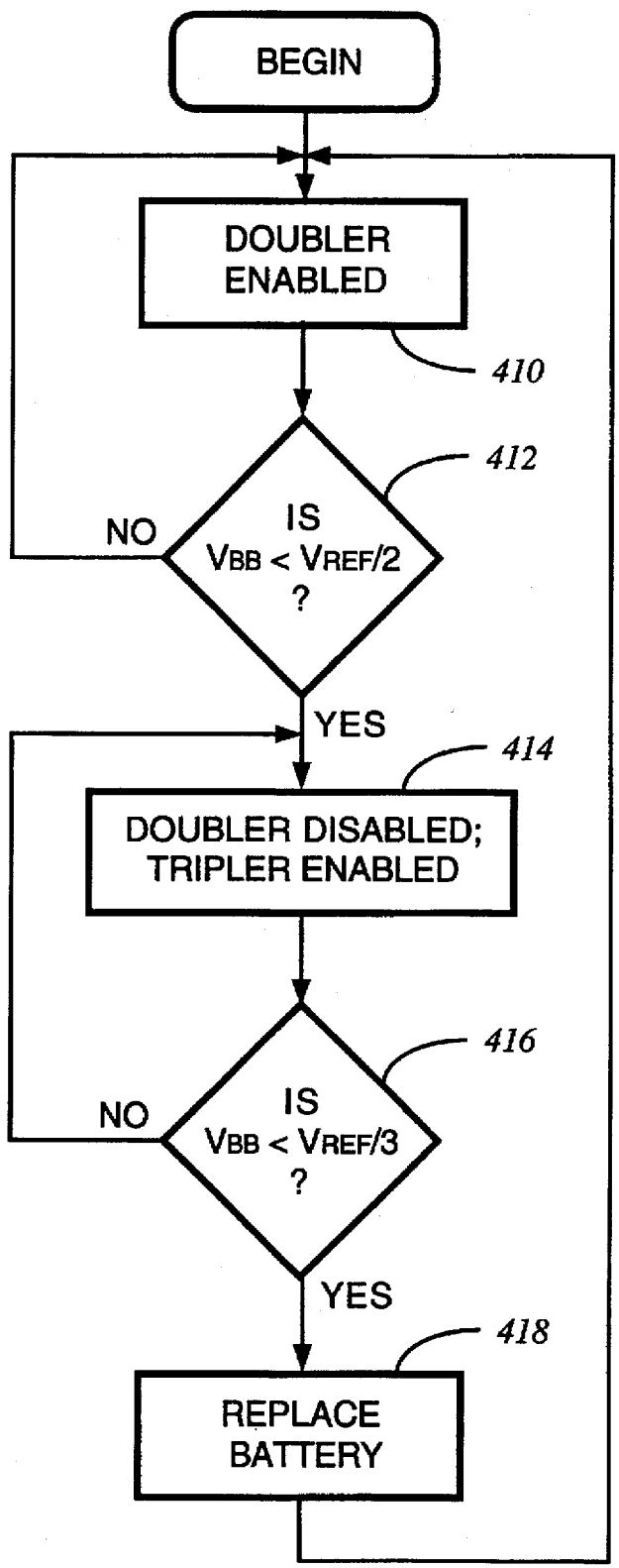
FIG. 4 is a flow diagram representing the operation of the DC to DC converter in accordance with a preferred embodiment of the invention.

As shown in the flow diagram of FIG. 4, initially when $V_{BB}$ is greater than or equal to $V_{REF}/2$, the doubler will be enabled, as illustrated by block 410. Vout will equal 2$V_{BB}$ during this time. Vout is then regulated down to the desired operating voltage $V_{DD}$. For the above example, the doubler will be enabled when $V_{BB} \geq$1.05V ($V_{REF}/2$). If $V_{BB}$ is not less than $V_{REF}/2$, the doubler will remain enabled. If $V_{BB}$ drops below $V_{REF}/2$ (1.05V) as illustrated by decision block 412, $V_{DD}$ will fall below the minimum operating voltage of 2.1V and the doubler will be disabled and the tripler will be enabled, as illustrated by block 414. Vout will equal 3$V_{BB}$ during this time, which is then regulated down to the desired operating voltage $V_{DD}$. Accordingly, in this example, the tripler will be active when 1.05V($V_{REF}/2$)>$V_{BB}$. If $V_{BB}$ drops below 0.7V ($V_{REF}/3$), as illustrated by decision block 416, $V_{DD}$ will fall below the minimum operating voltage of 2.1V and the battery should be replaced, as illustrated in block 418. If necessary, further multipliers could be utilized to produce Vout=N$V_{BB}$, where N=multiplier value.

Figure 5:
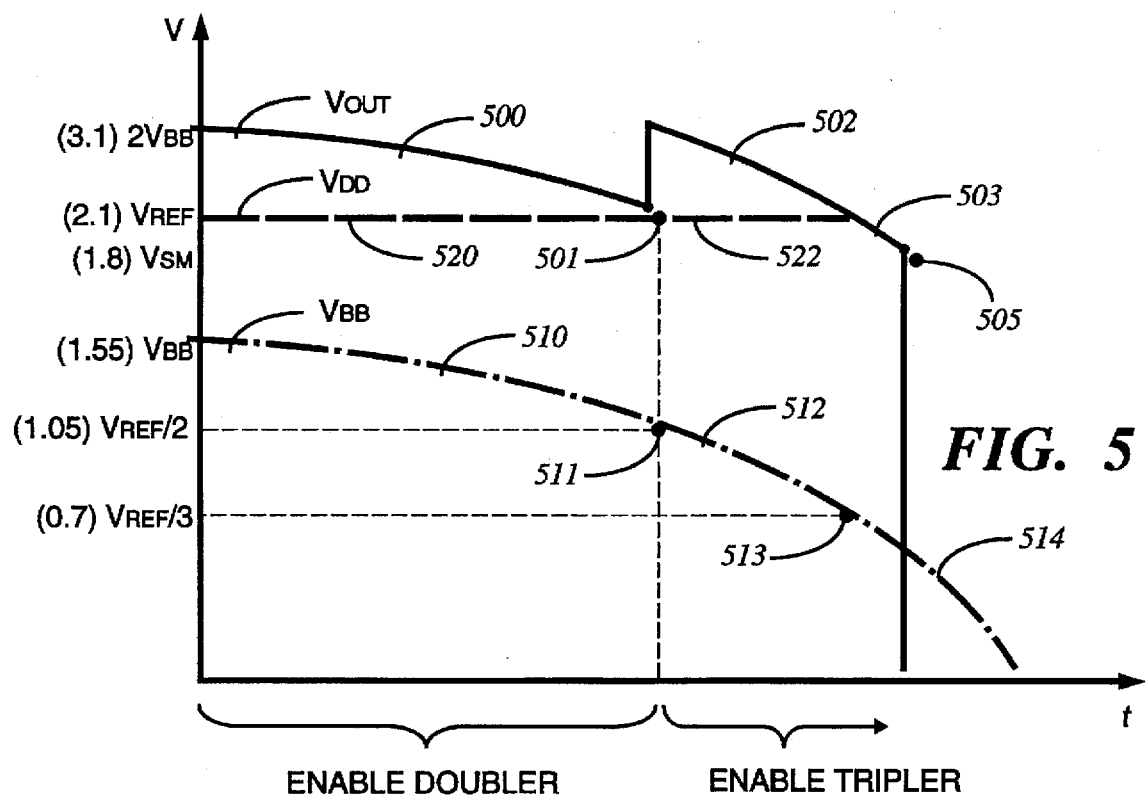
FIG. 5 is a graphical representation of voltage over time of $V_{out}$, $V_{DD}$ and $V_{BB}$.

In short, as shown in the graphs of FIG. 5, the battery voltage $V_{BB}$ is shown as a line (dash-dotted line) having segments 510, 512 and 514 as it decreases over time as it discharges. Vout is represented as a solid line having segments 500,502 and 503. The value of Vout decreases proportionately to $V_{BB}$ ("resetting" at the intersection of point 501). $V_{DD}$ is represented as a dashed line having segments 520 and 522. Initially, the doubler configuration is enabled and the value of $V_{DD}$ is regulated to the reference voltage $V_{REF}$=2.1V, segment 520. When $V_{BB}$ reaches $V_{REF}/2$ (e.g., 1.05V), at point 511 of the graph, Vout will equal $V_{DD}$, at point 501 of the graph. At this point, no regulation is necessary and the operation is at maximum efficiency.

After that point, a controller, such as a voltage management controller or microprocessor, will disable the doubler configuration and enable the tripler configuration of the DC to DC converter 130. Again Vout decreases proportionate to $V_{BB}$ over time, shown in segment 502. The value of $V_{DD}$ is again regulated to the reference voltage $V_{REF}$=2.1V, shown in segment 522. When $V_{BB}$ reaches $V_{REF}/3$ (e.g., 0.7V), at point 513 of the graph, Vout (and $V_{DD}$) will continue to decrease, both shown as segment 503, until the system limit voltage is reached, at point 505 of the graph, $V_{SM}$ (e.g., 1.8V). Usually upon reaching the system limit voltage, the decoder (microprocessor and support chip) will reset.

In the timing diagrams of FIG. 6, (with reference to FIG. 5), the DC to DC converter has three modes of operation. First, when $V_{BB} \geq V_{REF}/2$, segment 510, the doubler is enabled, segment 530, the tripler is disabled, segment 540, Vout=2$V_{BB}$, segment 500, and $V_{DD}$ is regulated to 2.1V, segment 520. Second, when $V_{REF}/2 > V_{BB} \geq V_{REF}/3$, segment 512, the tripler is enabled, segment 542, and the doubler is disabled, segment 532. Vout=3$V_{BB}$, segment 502, and $V_{DD}$ is regulated down to 2.1V, segment 522. Third, $V_{BB} < V_{REF}/3$, segment 514, the doubler remains disabled, segment 534, and although the tripler remains enabled, segment 544, Vout =3$V_{BB} < V_{REF}$, segment 503, and $V_{DD}$ can no longer be regulated to 2.1V. Furthermore, when $V_{DD}$ falls below a system limit of, for example, $V_{SM}$=1.8V, segment 505, the decoder (microprocessor and support chip) will reset. Generally, when $V_{REF}/(N-1) > V_{BB} \geq V_{REF}/N$, then only the N-multiplier is enabled. In this scenario, the DC-DC conversion circuitry includes a voltage detector for detecting a voltage level in a circuit; a number of converters for converting a first DC voltage (e.g., battery voltage) to a number of converted DC voltages (Vout). Each of the converters include a voltage multiplier (N). A selector responsive to the voltage detector selectively (e.g., sequentially) enables each of the converters. A voltage regulator is used to regulate the converted DC voltages to a regulated voltage ($V_{DD}$).

In operation, the selector initially enables a first converter having a voltage multiplier (N), wherein N is substantially equal to two (i.e., doubler). Then the selector disables the first converter (doubler), and sequentially enables each of the converters up to the plurality (tripler, quadrupler, etc.) each time the voltage level drops below a reference voltage. The reference voltage is substantially equal to a minimum required voltage to adequately drive a load. Each of the converters include the voltage multiplier (N), which has at least N−1 capacitors charged by a voltage source (e.g., battery) having a voltage level $V_{BB}$. The capacitors are configured to provide a voltage substantially equal to N multiplied by $V_{BB}$.

Figure 7:
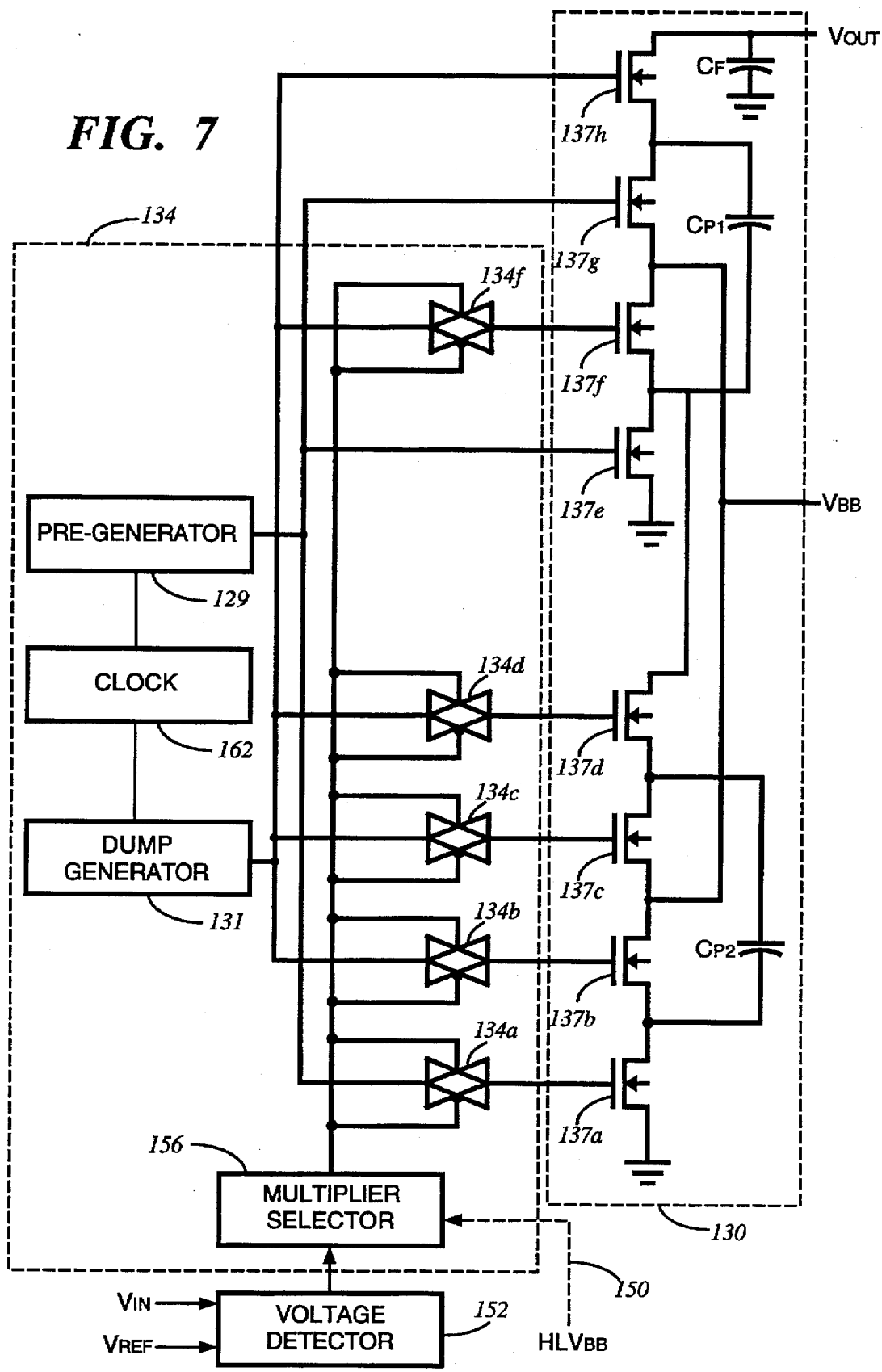
FIG. 7 is a block and circuit diagram of the multiplier and configurations of the capacitors for the DC to DC conversion.

The DC to DC conversion circuitry and selector circuitry are detailed in FIG. 7. The selector circuitry 134 includes a two-phase non-overlap clock generator 162 and the precharge and dump generators, 129, 131, for the DC to DC conversion circuit configurations, 130. Selector logic switches, 134a–d, and 134f, and numerous gates, 137a–h, control the various configurations for the DC to DC conversion circuits, 130. The multiplier selector 156 controls the activation of the switches, 134a–d, and 134f, in response to the voltage detector 152. Capacitors $C_{P1}$ and $C_{P2}$ are charged depending on the activated gates. A filter capacitor Cf is used to smooth the output.

In operation, as illustrated in FIG. 7, to configure the doubler DC to DC conversion circuit, the multiplier selector 156 closes switch 134f to select gate 137f. Gates 137e, 137g and 137h are directly connected without switches and, therefore, are always selected in this configuration. In the precharge phase, gates 137e and 137g (directly) are connected to the precharge generator 129 such that $C_{P1}$ is charged to $V_{BB}$. During the dump phase, gates 137h (directly) and 137f (through switch 134f) are connected to the dump generator 131 such that Vout=$V_{BB}$+$V_{CP1}$.

To configure the tripler, as illustrated in FIG. 7, the selector closes switches 134a, 134b, 134c, 134d, (switch 134f is open) to select gates 137a, 137b, 137c and 137d. Gates 137e, 137g and 137h are directly connected without switches. In the precharge phase, gates 137a and 137c (through switches 134a and 134c) and gates 137e and 137g (directly) are connected to the precharge generator 129 to charge $C_{P1}$ and $C_{P2}$ to $V_{BB}$. During the dump phase, gates 137b, 137d (through switches 134b and 134d) and gate 137h (directly) are connected to the dump generator 131, such that Vout=$V_{BB}$+$V_{CP1}$+$V_{CP2}$.

This arrangement is applicable when $V_{BB}$ decreases constantly over time. To control the switching of configurations, a voltage detector 152 compares an input voltage $V_{IN}$ (e.g., $V_{DD}$ or $V_{BB}$) to a value related to the reference voltage, $V_{REF}$, to determine the appropriate times to switch configurations (e.g., when $V_{REF}/2 > V_{BB} \geq V_{REF}/3$, the multiplier selector 156 can signal the tripler to be enabled, gates 137a, 137b, 137c, 137d, 137e, 137g, 137h, and the doubler to be disabled).

Alternately, since the values of Vout and $V_{DD}$ depend, in part, on $V_{BB}$, these voltages may be compared directly to the reference voltage $V_{REF}$ by the voltage detector 152 to determine the appropriate times to switch configurations (e.g., when Vout<$V_{REF}$ or when $V_{DD}$ can no longer be regulated to equal $V_{REF}$, the multiplier selector 156 can signal to switch to the next higher multiplier). Accordingly, depending on the desired configuration, one of the inputs to the voltage detector $V_{IN}$ can equal $V_{BB}$ or $V_{DD}$, depending on the value of the chosen reference voltage $V_{REF}$.

Figure 8:
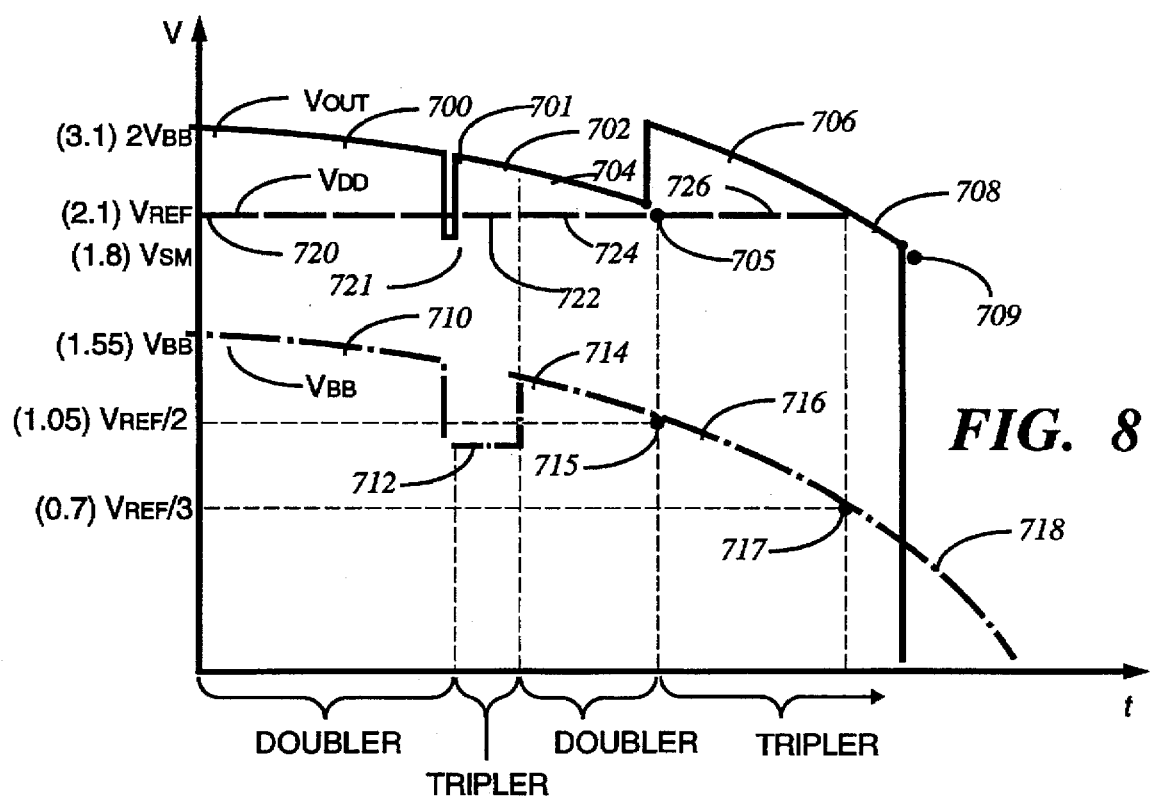
FIG. 8 is a graphical representation of voltage over time of $V_{out}$, $V_{DD}$ and $V_{BB}$ with $HLV_{BB}$ on for a period of time in an alternate embodiment of the invention.

Since there may be instances when the voltage may experience a sharp momentary decrease due to another load, (see segment 721 of FIG. 8) such as when a user utilizes a light or when a device signals with an alert, in an alternate embodiment, a control bit is used to signal the selector that the decrease in voltage is due to the load and not the discharge in the battery. After the load is disabled, $V_{BB}$ returns to its appropriate level (see segment 714 of FIG. 8). When $V_{BB}$ is no longer subject to the load, the appropriate multiplier needs to be enabled. The representative voltages for this situation are illustrated in the graph of FIG. 8 and discussed in detail hereafter.

Figure 10:
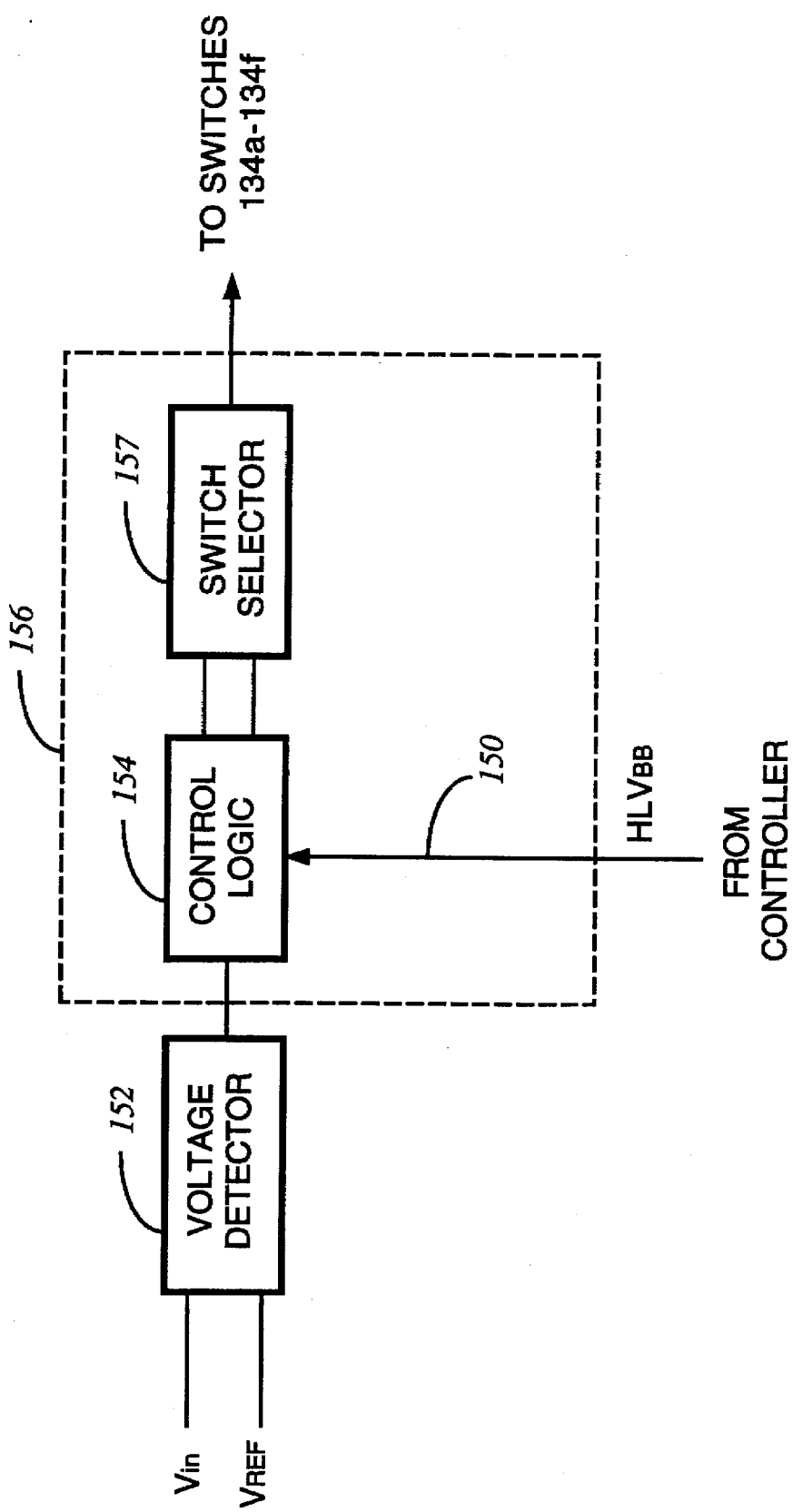
FIG. 10 is a block diagram showing the operating control for the DC to DC configurations in an alternate embodiment of the invention.

Accordingly, the alternate embodiment of the invention further includes, a control bit, HL$V_{BB}$ 150 (shown as dashed line 150 in FIG. 7) input to the multiplier selector 156 which the controller 124 activates just before the high battery current load is activated, shown in FIG. 10. Control logic 154 will signal the switch selector 157 depending on the inputs from the voltage detector 152, which compares a voltage (Vout or $V_{DD}$) to $V_{REF}$, and from the HL$V_{BB}$ 150. Accordingly, the configuration of the DC to DC converter depends on (1) the constantly decreasing battery voltage $V_{BB}$ as illustrated above and (2) the sharp decreases in voltage due to loading.

Generally, the controller 124 in the alternate embodiment generates a high load signal $HLV_{BB}$ 150 ($HLV_{BB}$=1) upon activation of a high load. The multiplier selector 156 initially enables the first converter (doubler configuration, gates 137e, 137f, 137g, and 137h), and, upon receipt of the high load signal 150 ($HLV_{BB}$=1), and $V_{DD}<V_{REF}$ the multiplier selector 156 temporarily disables the first converter (doubler configuration, gates 137e, 137f, 137g, and 137h) and temporarily enables the second converter (tripler configuration, gates 137a, 137b, 137c, 137d, 137e, 13g, 137h) until the high load signal 150 is inactive ($HLV_{BB}$=0).

As in the preferred embodiment, when the voltage level drops below the reference voltage due to battery discharge over time, the multiplier selector 156 disables the first converter (doubler configuration, gates 137e, 137f, 137g, and 137h) and enables the second converter (tripler configuration, gates 137a, 137b, 137c, 137d, 137e, 137g, 137h).

Specifically, for example, the controller 124 will set a control bit to "1" ($HLV_{BB}$=1) before it turns on the light for the display and will clear the control bit to "0" ($HLV_{BB}$=0) after it turns off the light. The voltage detector 152 continues to monitor the input voltage $V_{IN}$ (e.g., $V_{DD}$ or Vout) with respect to the reference voltage $V_{REF}$ to determine whether the voltage is out of regulation, namely less than the desired voltage. The outputs of the voltage detector 152 and the $HLV_{BB}$ signal 150 are supplied to control logic 154 which controls the switch selector 157 for selecting the appropriate DC to DC converter configurations.

The switching between the configurations relative the voltage levels, in accordance with the alternate embodiment is shown in FIGS. 8 and 9. In short, as shown in the graphs of FIG. 8, the battery voltage $V_{BB}$ decreases over time as it discharges, illustrated in the dashed-dotted line shown by segments 710, 714, 716 and 718. The output voltage from the DC to DC converters, Vout, is shown as the solid line having segments 700, 702, 704, 706, and 708. Normally, the value of Vout decreases in proportion with the battery voltage, with a sharp increase in voltage when the configuration switches from doubler to tripler, point 705. The regulated voltage $V_{DD}$ is illustrated in the dashed line having segments 720, 722, 724, 726, and (solid line segment 708). $V_{DD}$ is regulated to equal $V_{REF}$.

As in the preferred embodiment, when $V_{BB}$ reaches $V_{REF}/2$ (e.g., 1.05V), point 715 of the graph, Vout will equal $V_{DD}$, point 705 of the graph. At this point no regulation is necessary and the operation is at maximum efficiency. After that point, the microprocessor will disable the doubler and enable the tripler. Again $V_{BB}$ decreases over time as it discharges, segments 716 and 718. Vout decreases in proportion to $V_{BB}$ over time, segments 706 and 708. $V_{DD}$ again is regulated to equal $V_{REF}$, segment 726. Finally, when $V_{BB}$ reaches $V_{REF}/3$ (e.g., 0.7V), point 717, the battery power is no longer sufficient to power the circuitry, and Vout and $V_{DD}$ decrease, segment 708, until a system limit is reached, $V_{SM}$ (e.g., 1.8V), point 709. At that point the microprocessor resets and the battery should be replaced.

When a user utilizes a light or when a device signals with an alert $V_{DD}$ will experiences a sharp momentary decrease, segment 721. At that point, Vout, segment 701 also decreases momentarily due to this load. The battery voltage $V_{BB}$ may also experience a decrease in voltage, segment 712, during the load. At this point, in the alternate embodiment, the controller will signal the selector to temporarily enable the tripler to provide increased voltages for Vout, segment 702, and $V_{DD}$, segment 722. $V_{DD}$, therefore, has sufficient voltage to drive the load until the power drain is discontinued. Then, after the load is discontinued, the controller will signal the selector to return the DC to DC converter to the doubler configuration, and continue therefrom until either the battery discharges to a power level requiring the tripler, point 715, or another load forces temporary enabling of the tripler.

In short, as shown in the timing diagram of FIG. 9, (with reference to FIG. 8), when $V_{BB} \geq V_{REF}/2$, segments 710, 714, the doubler is enabled, segment 730, and the tripler is disabled, segment 740, and $HLV_{BB}$ is off, segment 750. $V_{DD}$ is regulated to 2.1V, segment 720.

When a high battery current load component, such as a light, is to be activated, the controller 124 first sets the $HLV_{BB}$ bit to "1", segment 752. Then the controller 124 turns on the high battery current load component which lowers the battery level, segment 712, and in turn lowers Vout and $V_{DD}$ levels, segments 701, 721. If $V_{DD}$ drops below the required regulated voltage, $V_{REF}$, then $V_{DD}$ is then "out of regulation" as measured by the voltage detector 152. The DC—DC conversion circuits 130 are switched from doubler configuration (doubler disabled, segment 732) to tripler configuration (tripler enabled, segment 742) to bring $V_{DD}$ back to regulation, segment 722. After the controller 124 turns off the high battery current load components, $V_{BB}$ goes back to its previous level, segment 714. The controller 124 then clears the $HLV_{BB}$ bit, segment 754, which directs the multiplier selector 156 to switch back from the tripler (tripler disabled, segment 744) to the doubler (doubler enabled, segment 734) to achieve high efficiency and prolong the battery life. $V_{DD}$ again is regulated to 2.1V, segment 724.

When $V_{REF}/2 > V_{BB} \geq V_{REF}/3$, segment 716, the tripler is enabled, segment 746, and the doubler is disabled, segment 736. Again $V_{DD}$ is regulated down to 2.1V, segment 726. $HLV_{BB}$ is off, segment 756. Once $V_{BB} < V_{REF}/3$, segment 718, $V_{DD}$ can no longer be regulated to 2.1V, segment 708. Accordingly, the doubler remains disabled, segment 738, and the tripler is unchanged, segment 748. $HLV_{BB}$ remains off, segment 758. Upon reaching a system limit $V_{SM}$ (e.g., 1.8V), point 709, the microprocessor resets.

The method of operation can be described, generally as the steps of: (1) enabling a first converter (doubler configuration, gates 137e, 137f, 137g, and 137h) for converting a first DC voltage to a first converted DC voltage and regulating the first converted DC voltage to a regulated voltage; (2) detecting a voltage level in a circuit with a voltage detector 152; (3) setting a high load signal $HLV_{BB}$ 150 when a high power load is to be enabled and temporarily disabling the first converter (doubler configuration, gates 137e, 137f, 137g, and 137h) and temporarily enabling a second converter (tripler configuration, gates 137a, 137b, 137c, 137d, 137e, 137g, 137h) for converting the first DC voltage to a second converted DC voltage and regulating the second converted DC voltage to the regulated voltage, while the high load signal is active; (then returning to step 1), and (4) disabling the first converter (doubler configuration, gates 137e, 137f, 137g, and 137h) and enabling the second converter (tripler configuration, gates 137a, 137b, 137c, 137d, 137e, 137g, 137h) for converting the first DC voltage to the second converted DC voltage and regulating the second converted DC voltage to the regulated voltage responsive to the voltage detector when the voltage level drops below a reference voltage substantially equal to a minimum required voltage to adequately drive a load.

Figure 11:
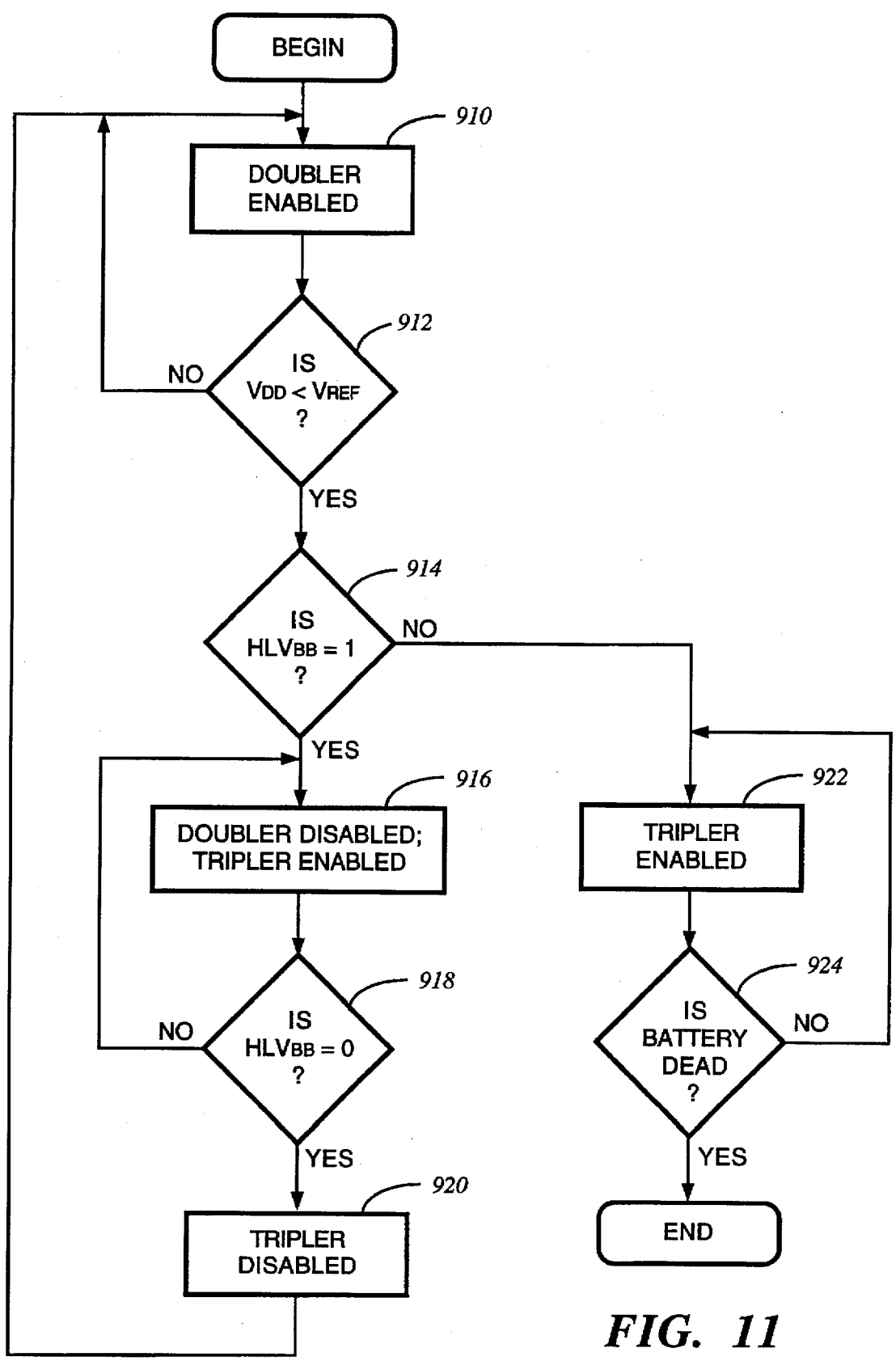
FIG. 11 is a flow diagram representing the operation of the DC to DC converter in accordance with an alternate embodiment of the invention.

The steps of operation are shown in FIG. 11. Initially, the doubler is enabled, block 910, to double $V_{BB}$ to produce $V_{out}=2V_{BB}$. Vout is then regulated down by conventional means to the desired regulated voltage $V_{DD}$ (e.g., 2.1V). A voltage detector 152 will monitor the regulated voltage $V_{DD}$ to determine whether the regulated voltage drops below the required level, $V_{REF}$. If $V_{DD}$ drops below the required regulated level ($V_{DD}<V_{REF}$), decision block 912, then if the $HLV_{BB}=1$ (high battery current load component in use), decision block 914, the multiplier is switched from the doubler to the tripler (doubler disabled; tripler enabled block 916). The tripler remains enabled until $HLV_{BB}=0$ (high battery current load component no longer in use), decision block 918. Once $HLV_{BB}=0$, the tripler is disabled, block 920, and the doubler is enabled, block 910, as it initially was.

If, however, $V_{DD}$ drops below the required regulated level ($V_{DD}<V_{REF}$) and $HLV_{BB}=0$ (high battery current load component not in use), decision block 914, then the multiplier selector 156 switches the configurations from the doubler to the tripler, block 922, and will remain in the tripler configuration until the battery completely discharges (or drops below a usable range), block 924.

As illustrated above, a number of multipliers may be utilized. In this case, the multiplier selector initially enables one of a number of converters having a voltage multiplier (N), wherein N is substantially equal to two, (doubler). Each time the voltage level drops below a reference voltage, provided the high load signal is inactive, the selector disables the first converter, and selectively (e.g., sequentially) enables each of the subsequent converters up to the plurality. Upon receipt of the high load signal, the selector temporarily disables a currently enabled converter having a voltage multiplier (N), and temporarily enables the next converter having a voltage multiplier (N+1), until the high load signal is inactive.

A number of advantages arise from practice of this method and apparatus for DC to DC conversion. The invention provides for increased battery life by utilizing selector circuitry which changes multiplier configurations depending upon voltage levels, thereby allowing the circuitry to operate even after the battery voltage has dropped below limits set by using only a doubler. The invention also determines whether a decrease in voltage is due to a high load or from usage over time, and switches the multiplier configurations accordingly to obtain high efficiency.

Thus, it is apparent that there has been provided, in accordance with the invention, a method and apparatus for DC to DC conversion. While the invention has been described and illustrated with reference to specific embodiments thereof, it is not intended that the invention be limited to these illustrative embodiments. Those skilled in the art will recognize, after review of the foregoing description, that variations and modifications differing from the illustrative embodiments are possible. It is intended that all such variations and modifications as fall within the spirit and scope of the invention be included within the appended claims.

What is claimed is:

1. A method of DC to DC conversion comprising the steps of:
    enabling a first converting means comprising a voltage doubler for converting a first DC voltage to a first converted DC voltage and regulating said first converted DC voltage to a single predetermined regulated voltage;
    detecting a voltage level in a circuit with a voltage detect means;
    setting a high load signal when a high power load is to be enabled and temporarily disabling said first converting means and temporarily enabling a second converting means comprising a voltage doubler for converting said first DC voltage to a second converted DC voltage and regulating said second converted DC voltage to said single predetermined regulated voltage, while said high load signal is active;
    disabling said first converting means and enabling said second converting means for converting said first DC voltage to said second converted DC voltage and regulating said second converted DC voltage to said single predetermined regulated voltage responsive to said voltage detect means when said voltage level drops below a reference voltage, wherein said reference voltage is substantially equal to a minimum required voltage to adequately drive a load.

2. The method of claim 1, wherein said step of enabling said voltage doubler comprises charging at least one capacitor by a voltage source having a voltage $V_{BB}$, configured to provide double $V_{BB}$, and wherein said step of enabling said voltage tripler comprises charging at least two capacitors by said voltage source having said voltage $V_{BB}$, configured to provide triple $V_{BB}$.

3. A DC-DC converter comprising:
    voltage detect means for detecting a voltage level in a circuit;
    first converting means comprising a voltage doubler for converting a first DC voltage to a first converted DC voltage;
    second converting means comprising a voltage tripler for converting said first DC voltage to a second converted DC voltage;
    selector means responsive to said voltage detect means for selectively enabling said first or said second converting means, said selector means initially enabling said first converting means, and said selector means disabling said first converting means and enabling said second converting means when said voltage level drops below a reference voltage; and
    regulating means for regulating said first and second converted DC voltage to a single predetermined regulated voltage.

4. The DC-DC converter of claim 3, wherein said reference voltage is substantially to a minimum required voltage to adequately drive a load.

5. The DC-DC converter of claim 4, wherein said voltage doubler comprises at least one capacitor charged by a voltage source having a voltage $V_{BB}$, configured to provide double $V_{BB}$, and wherein said voltage tripler comprises at least two capacitors charged by said voltage source having said voltage $V_{BB}$, configured to provide triple $V_{BB}$.

6. The DC-DC converter of claim 3, further comprising high load signaling means for generating a signal upon activation of a high load.

7. The DC-DC converter of claim 6,
    wherein said selector means initially enables said first converting means, and
    wherein, when said voltage level drops below a reference voltage and upon receipt of said high load signal, said selector means temporarily disables said first converting means and temporarily enables said second converting means until said high load signal is inactive; and
    wherein, when said voltage level drops below said reference voltage and while said high load signal is inactive, said selector means disables said first converting means and enables said second converting means.

8. The DC-DC converter of claim 7, wherein said first converting means comprises a voltage doubler, and wherein said second converting means comprises a voltage tripler.

9. The DC-DC converter of claim 8, wherein said reference voltage is substantially equal to a minimum required voltage to adequately drive a load.

10. The DC-DC converter of claim 9, wherein said voltage doubler comprises at least one capacitor charged by a voltage source having a voltage V$_{BB}$, configured to provide double V$_{BB}$, and wherein said voltage tripler comprises at least two capacitors charged by said voltage source having said voltage V$_{BB}$, configured to provide triple V$_{BB}$.

11. A DC-DC converter comprising:

voltage detect means for detecting a voltage level in a circuit;

a first through N converting means for converting a first DC voltage to a plurality of converted DC voltages, wherein each converting means comprises a voltage multiplier;

selector means responsive to said voltage detect means for selectively enabling each of said first through N converting means; and regulating means for regulating each of said plurality of converted DC voltages to a single predetermined regulated voltage.

12. The DC-DC converter of claim 11, wherein said selector means initially enables the first of said first through N converting means, said first converting means having a voltage multiplier equal to two, and wherein said selector means disables said first converting means, and sequentially enables each of said converting means up to N, each time said voltage level drops below a reference voltage.

13. The DC-DC converter of claim 12, wherein said reference voltage is substantially equal to a minimum required voltage to adequately drive a load.

14. The DC-DC converter of claim 13, wherein each of said first through N converting means comprises at least one capacitor charged by a voltage source having a voltage level V$_{BB}$, each of said first through N converting means configured to provide a voltage substantially equal to a multiple of V$_{BB}$.

15. The DC-DC converter of claim 11, further comprising high load signaling means for generating a signal representative of activation of a high load.

16. The DC-DC converter of claim 15, wherein said selector means initially enables one of said first through N converting means having a voltage multiplier substantially equal to two, and wherein, each time said voltage level drops below a reference voltage, provided said high load signal is inactive, said selector means disables said one converting means, and sequentially enables each of said plurality of converting means up to said N converting means; and wherein, upon receipt of said high load signal, said selector means temporarily disables said a currently enabled one of converting means, and temporarily enables a second one of said converting means having a voltage multiplier of three, until said high load signal is inactive.

17. The DC-DC converter of claim 16, wherein said reference voltage is substantially equal to a minimum required voltage to adequately drive a load.

* * * * *